(12) United States Patent
Ventura et al.

(10) Patent No.: US 6,668,259 B1
(45) Date of Patent: Dec. 23, 2003

(54) TRACKING METHOD FOR STORING EVENT DATA USING DATABASE-OBJECTS

(75) Inventors: David Ventura, Riverside, IL (US); Michael P. Santell, New Berlin, WI (US)

(73) Assignees: Rockwell Automation Technologies, Inc., Mayfield Heights, OH (US); The Ultimate Software Consultants, Lombard, IL (US)

( * ) Notice: Subject to any disclaimer, the term of this patent is extended or adjusted under 35 U.S.C. 154(b) by 313 days.

(21) Appl. No.: 09/654,755

(22) Filed: Sep. 5, 2000

Related U.S. Application Data
(60) Provisional application No. 60/195,670, filed on Apr. 7, 2000.

(51) Int. Cl.[7] .............................................. G06F 17/30
(52) U.S. Cl. ..................................................... 707/103 R
(58) Field of Search ............................ 707/2, 3, 9, 100, 707/101, 103 R, 103 Y, 103 Z; 709/201, 202

(56) References Cited

U.S. PATENT DOCUMENTS
6,125,363 A * 9/2000 Buzzeo et al. .............. 707/100

OTHER PUBLICATIONS
Mansour Zand et al. "A survey of Current Object–Oriented Databases", Feb. 1995.*
Elisa Bertino et al. "Extending the ODMG Object Model with Composite Objects", Oct. 1998.*

* cited by examiner

*Primary Examiner*—Diane D. Mizrahi
*Assistant Examiner*—Apu M Mofiz
(74) *Attorney, Agent, or Firm*—Quarles & Brady LLP; Alexander M. Gerasimow; William R. Walbrun

(57) ABSTRACT

Business transactions or other events may be structured as a series of database-objects formed of combinations of sub-objects which in turn may depend on yet a lower level of objects. By creating object templates for the objects that progressively group inter-correlated data and inter-correlated objects, large amounts of event data may be captured with modest data storage requirements. The system is particularly well suited for capturing sales events comprised of a large range of data of different attributes.

30 Claims, 2 Drawing Sheets

TRACKING METHOD FOR STORING EVENT DATA USING DATABASE-OBJECTS

CROSS-REFERENCE TO RELATED APPLICATIONS

This application hereby claims the benefit of provisional application 60/195,670, filed Apr. 7, 2000.

STATEMENT REGARDING FEDERALLY SPONSORED RESEARCH OR DEVELOPMENT

BACKGROUND OF THE INVENTION

The present invention relates to a method for storing data about events in time, such as sales of a product, and in particular to a method of using database-objects to track large amounts of data associated with such events in an efficient manner.

Computer databases allow the storage and retrieval of data. The data may be linked in records holding data elements so that a particular data element may be identified or sorted based on other elements of its record.

Such electronic databases can be extremely useful in tracking business information particularly where the information can be easily fit into a small number of records with a limited number of data elements. For example, a physician might readily track patients, their addresses and insurance carriers using a record-type structure.

Some business data does not readily lend itself to the simple record structure. For example, it might be desirable to track a large number of attributes related to sales of product. The attributes of such sales events may include for example: the time of the sale, the product, the product components, the selling division, the customer purchasing agent, the buying enterprise, the location of the enterprise, the responsible sales and manufacturing units, and many others.

The importance of a sales event to a business enterprise makes it desirable for the number of attributes recorded not be unduly limited. The data of these attributes can be used for a variety of purposes including the coordination of different operations within the business, strategic planning and record keeping. On the other hand, the number of sales events in even a modest company can be extremely large. A conventional record structure in which one record is allocated to each sales event and one data element to each recorded attribute of each sales event, rapidly exhausts the storage capacity and power of conventional business computers.

BRIEF SUMMARY OF THE INVENTION

The present inventors have recognized that "database-objects" being part of an object-oriented database, can provide for efficient storage of extremely large numbers of attributes associated with frequent events. Database-objects operate in some ways analogously to software objects, that is, they can inherit data and structure from other objects without the need to reproduce the data or structure. By breaking event data into groups of increasing intercorrelation (i.e. groups whose elements are relatively stable across events) through the use of database-objects, data storage requirements are much reduced and event data is easier to assemble.

For example, the extremely dynamic concept of a sales event can be assembled from the intersection of relatively static groupings data about products, customer and fulfillment of the sale. Each sales event can be an instance of a database-object template referencing instances of database-objects of product, customer and fulfillment. These underlying database-objects in turn can be further reduced to more stable database-objects, for example, the customer's database-object can be assembled from data representing an enterprise, an agent and a location. The need for new instances of database-objects is reduced as the groupings of the objects become more stable, and the use of database-objects, which reference but do not duplicate data, makes the overall storage requirements low.

Specifically then the present invention provides a method of capturing "event data" of events over time using an object-oriented database having database-object templates that may reference attributes of the event data and other database-object templates that may be instantiated to create database-object instances referencing data of the attributes of the database-object templates and instances of the other database-object templates.

The method includes a first step of defining a set of underlying database-object templates each possibly referencing at least a portion of the attributes of the event data. In a second step, an event database-object template referencing at least a portion of the underlying database-objects templates is defined. Upon each event, having given event data, given ones of the set of underlying database-object templates referencing attributes of the given event data are instantiated. Finally, an event database-object template referencing the instanced given ones of the set of underlying database-object templates is referenced.

Thus it is one objective of the invention to provide a rapid method of capturing complex and variable event-type data. By defining database-objects in a hierarchical fashion, event database-objects, capturing the required data, can be easily defined by identifying a smaller number of underlying objects.

Intermediate database-objects may be positioned between the underlying database-objects and the event database-objects in a multi-layered hierarchy.

Thus it is another objective of the invention to leverage recorded data through multiple layers of database-objects further reducing storage requirements and simplifying recordation of event data.

Each progressive layer of database-objects is defined to reference attributes of increasing intercorrelation or increasingly intercorrelated database-objects over different events.

Thus it is another objective of the invention to minimize the burden of instantiating database-objects. The groupings provide some permanence to each instanced database-object while the layers of objects reduce the propagation of any changes in the data in the direction of the event database-object.

In one embodiment, the event database-object template may represent a sales event and be made up of:
 (1) a customer database-object in turn referencing:
   (a) a location database-object template referencing attributes indicating customer locations;
   (b) an agent database-object template referencing attributes indicating customer agents;
   (c) an enterprise database-object template referencing attributes indicating customer enterprises; and a
 (2) a product database-object in turn referencing:
   (a) a product information database-object template referencing attributes indicating product information;
   (b) a product business database-object template referencing attributes indicating product business;

(c) a product design database-object template referencing attributes indicating product designs; and a (3) a fulfillment database-object in turn referencing:
(a) a fulfillment logistics database-object template referencing attributes indicating fulfillment logistics;
(b) a fulfillment services database-object template referencing attributes indicating fulfillment services; and
(c) a fulfillment manufacturing support chain database-object template referencing attributes indicating fulfillment manufacturing support chain.

Thus it is another objective of the invention to provide a practical structure for recording sales events comprised of a complex set of underlying data.

The foregoing and other objectives and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE INVENTION

Figure 1:
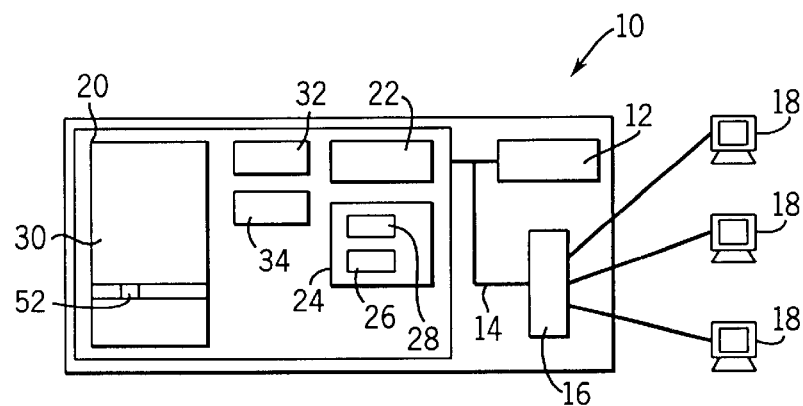
FIG. 1 is a block diagram of computer architecture suitable for use with the present invention providing a processor and a memory holding an object-oriented database program executed by the processor into which the structures of the present invention may be placed.

Referring now to FIG. 1, an electronic computer 10 suitable for use with the present invention includes a processor 12 communicating on an internal bus 14 with an internal memory 20 such as may comprise a combination of solid-state memory and mass storage devices such as magnetic disk drives. The processor may also communicate via internal bus 14 with a port 16 connected with input/output terminals 18. The processor 12 executing an operating system 22 may thus act as a server for the terminals 18 according to well-known architectures.

The memory 20 also includes an object-oriented database 24 such as is commercially available from the Oracle Corporation of Redwood Shores, Calif., U.S.A. under the trade name of Oracle 8i. Such an object-oriented database 24 includes a query engine 26 of a type well known in the art and object management modules 28 whose operation will be described below.

The object-oriented database 24 deals with an underlying database 30 of data elements 52 entered by the users through various terminals 18 together with user defined object templates 32 and instanced database-objects 34, each of which will be described.

Figure 2:
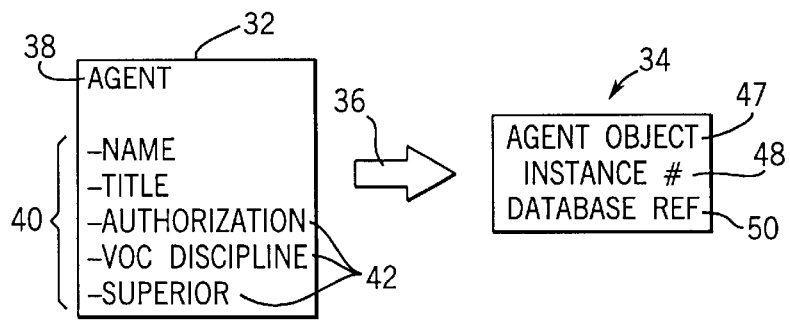
FIG. 2 is a simplified diagram of the operation of a method of instancing a database-object showing the relatively low memory overhead of such an instancing.

Referring now to FIG. 2, the principles of object oriented design, well known in the areas of program development, provide for program reusability and efficient memory management through the generation of a variety of "software objects" which may be "instanced" and which may be combined to form more complex objects through the process of "association".

A "database-object" is analogous providing an object template 32 having an object name 38 and a data structure 40 comprised of data types 42 describing data that may be held in elements 52 within the database 30. In the present invention, a database-object of AGENT representing a person who may buy products on behalf of a business customer, includes a data structure providing text variable of NAME being the name of a person representing the AGENT, a TITLE being the title of that person within an organization of which the AGENT is part and also a text variable, an AUTHORIZATION which may be a text or numeric variable indicating the authorization of the AGENT for purchases, a VOCATIONAL DISCIPLINE which may be a selection from a set of possible disciplines or a text field, and a text variable of SUPERIOR which indicates the superior of the AGENT. In this way, the object template 32 like a template for a software object, represents a physical object, in this case, a person.

Like a software object, the object template 32 may be instanced in an instancing process 36 to create an instanced database-object 34 representing a particular object in highly compressed form. The instanced database-objects 34 provide source template data 47 indicating the template from which it is formed, in this case the template 32. Also included is a unique instance number 48 and various database references 50 ultimately leading to particular data elements 52 satisfying each of the data structures 40. The database references may point to memory locations (or more typically memory offsets) or may point to another database-object in the case of inheritance as will be described below.

In all cases, however, the data will not be stored in the instanced database-objects 34 and thus, multiple instanced database-objects 34 having possibly redundant data elements 52 may be efficiently represented. Normally the instancing process requires relatively little storage compared to duplicating the data of the instanced database-object 34, but there is some storage overhead in holding references 50 necessary in the instanced database-object 34 and therefore even instancing is desirably held to a minimum.

The instancing process 36 is a method inherent in the program 24, which creates an instanced database-object 34 and prompts the user to provide the necessary references to data to complete that object. Default data values may be provided when the object is initially instanced. In this regard, the generation of the lowest level of instanced database-objects 34 is not much different, in terms of effort, from entering a data record in a conventional database. The properties of inheritance, however, provide considerable leverage in creating higher-level data objects.

Figure 3:
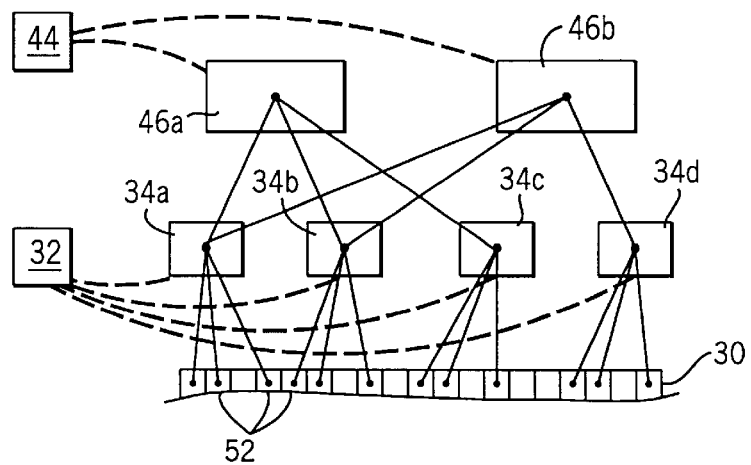
FIG. 3 is a hierarchical diagram showing inheritance of combination objects providing a high degree of data leverage and the ability to create highly variable high level objects from less variable low level objects.

Referring now to FIG. 3, the properties of inheritance may be used to create combination instanced database-objects 46a and 46b from instanced database elements 44a, 44b and 44c. The combination instanced database-objects 46a and 46b are defined by a template 44 similar to template 32 but providing the name of a combination database-object and referencing other database-objects in the structure portion as well as data types. In the former case, the template 44 incorporates the structure 40 of the templates 32 which it references.

Each combination instanced database-objects 46a and 46b may be rapidly created by identifying previously instanced database-objects 34. Thus, combination instanced database-object 46a inherits the data of instanced database-objects 34a, 34b and 34c while combination instanced database-object 46b inherits the data of instanced database-objects 34a, 34b and 34d. Thus combination instanced database-objects 46d may be rapidly created from pre-existing instances of lower level objects. This process can be repeated for an arbitrary number of levels of database-objects each formed of database-objects and data from a lower level. A reference of a given database-object may thus pass through many intermediate database-objects prior to reaching actual data elements 50.

The hierarchical structure provides not only for rapid generation of new combination instanced database-objects 46 in a memory efficient way, but allows for the unrestrained definition of objects that are extremely variable in their data in an efficient manner as resulting from an effect in which highly variable high level objects may be constructed of less variable low level objects so that each level down in the hierarchy greater stability in the data is found. The ability to utilize this effect of the object oriented database structure requires proper definition of the high level objects and the objects from which they are created. Such a definition forms a key to the present invention which generally groups data elements 52 into database-objects 34 then database-objects 34 into higher database-objects 46 such that the elements of each group are highly correlated with respect to each other (inter-correlated) over different events. What this means is that it is likely that each new event object 46 can be constructed of pre-existing lower database-objects 34. This simplifies creation of the event objects 46 and reduces instantiations of lower database-objects 34 such as uses storage capacity.

Figure 4:
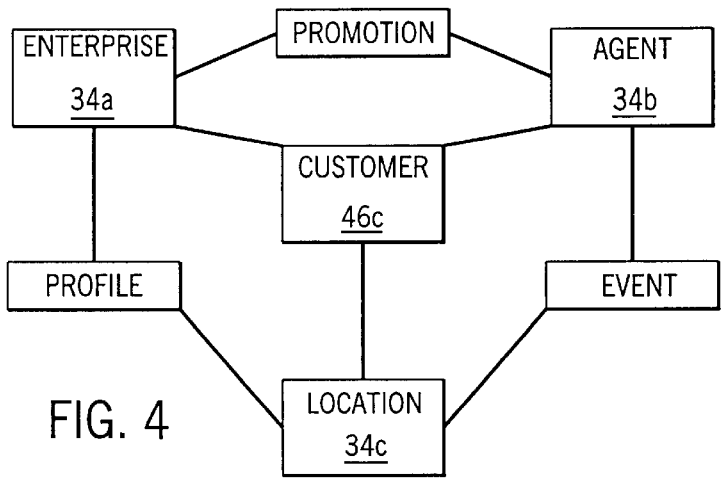
FIG. 4 is a representation of the hierarchy of data objects per the present invention in which a customer object is built from enterprise, agent, and location objects.

Referring now to FIG. 4, one example of the present invention provides such a structure in which a CUSTOMER combination instanced database-objects 46c may be defined from an ENTERPRISE instanced database-objects 34a, an AGENT instanced database-objects 34b and a LOCATION instanced database-objects 34c. Generally the ENTERPRISE instanced database-objects 34a will point to data elements 52 within the database providing: a name of an enterprise, its type of industry, its size, its purpose, its credit rating, its revenue, its profitability, and a parent organization, if any. Generally these will be text variables. The AGENT instanced database-objects 34b will point to data elements 52 of the database 30 providing: a first name, last name and middle initial of an agent, the job title of the agent, various information about the agent, the agent's purchasing authority, the agent's preferences, the agent's vocational discipline, and who the agent reports to. These will also generally be text variables. The LOCATION instanced database-objects 34c points to data elements 52 providing a description of a location of the enterprise and a site address which may include a conventional post office address providing street, suite, post office box, city, state, postal code, country and the like, and/or an Internet based address including a path, domain, a suffix, and a start address, and/or a telephone address including country code, area code, number and extension.

As will be understood, these data elements 52 of the LOCATION, ENTERPRISE and AGENT instanced database-objects 34a–c are relatively stable.

A CUSTOMER combination instanced database-objects 46c inherits the structures of each of the LOCATION, ENTERPRISE and AGENT templates 32 (not shown) and points to specific instances of the ENTERPRISE, instanced database-objects 34a, the AGENT instanced database-objects 34b and the LOCATION instanced database-objects 34c per their instance numbers 48. Thus CUSTOMER combination instanced database-objects 46c may be freely defined representing various combinations of pre-existing or newly instanced ENTERPRISE, AGENT and LOCATION instanced database-objects 34a–c without undue effort of memory usage. Generally many of the CUSTOMER combination instanced database-objects 46c will share one or more of the ENTERPRISE AGENT and LOCATION instanced database-objects 34a–c thus greatly simplifying their enrollment and providing for an efficient representation.

Figure 5:
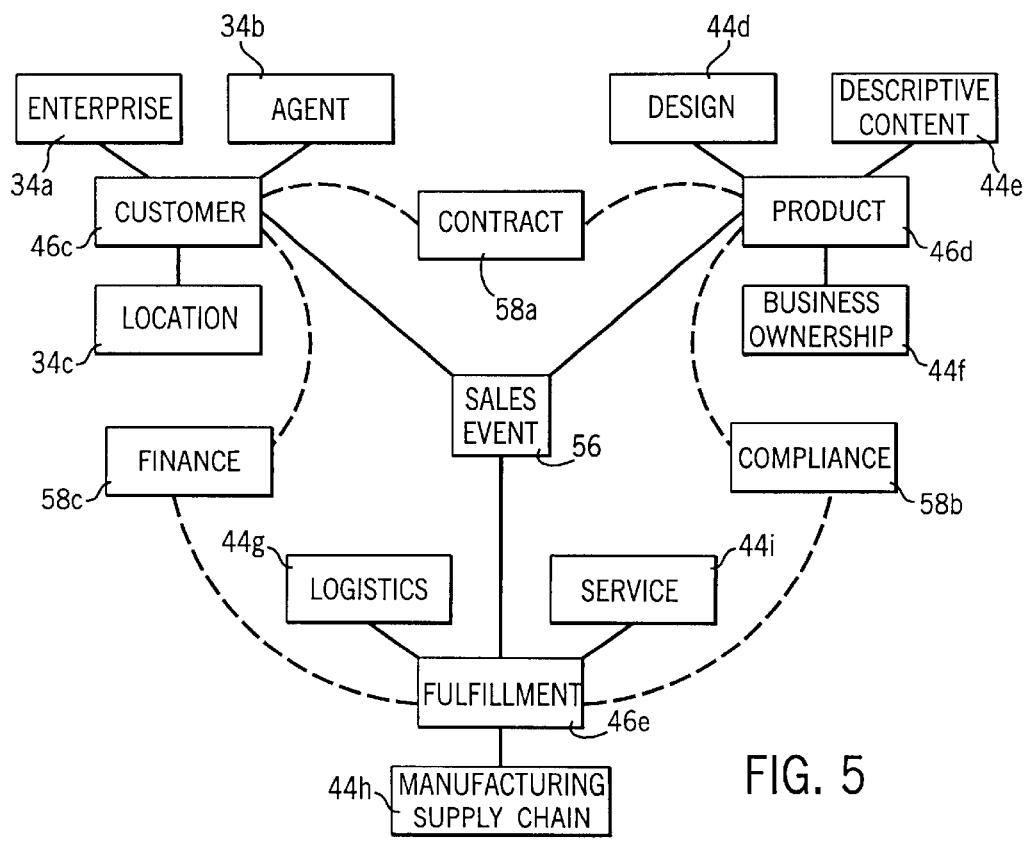
FIG. 5 is a figure similar to that of FIG. 4 showing the customer object of FIG. 4 as incorporated into a larger hierarchy leasing to a sales event object built of the customer object, a product object and a fulfillment object, the latter two which are in turn constructed of lower level objects.

Referring now to FIG. 5, the CUSTOMER combination instanced database-objects 46c may in fact be part of a larger structure providing for a SALES EVENT high-level instanced database-object 56. This database-object inherits the qualities of the CUSTOMER combination instanced database-objects 46c, a PRODUCT combination instanced database-objects 46d and a FULFILLMENT combination instanced database-objects 46e and like the CUSTOMER combination instanced database-objects 46, may take on data values from specific instances of each of these combination instanced database-objects 46c through 46e.

The PRODUCT combination instanced database-objects 46d in turn is based upon objects of a PRODUCT DESIGN instanced database-objects 44d, DESCRIPTIVE CONTENT instanced database-objects 44e and BUSINESS OWNERSHIP instanced database-objects 44f. These database-objects may include intermediate objects as well. The FULFILLMENT database-object may in turn be made up of instanced database-objects 44g of LOGISTICS, instanced database-objects 44h of MANAGEMENT MANUFACTURING SUPPLY CHAIN, and instanced database-objects 44i of SERVICE which may include intermediate objects as well.

The structure as shown in FIG. 5 also allows for the generation of additional high-level instanced database-objects 58a through 58c made evident by this structure in various combinations of combination instanced database-objects 46c through 46e. For example, a CONTRACT high-level instanced database-object 58 may be defined as the combination of the CUSTOMER and PRODUCT combination instanced database-objects 46c and 46d. A COMPLIANCE additional high-level instanced database-object 58b may be defined as the combination of PRODUCT combination instanced database-objects 46d and FULFILLMENT combination instanced database-objects 46e. Further a FINANCE high-level instanced database-object 58c may be defined as the combination of a CUSTOMER combination instanced database-objects 46c and a FULFILLMENT combination instanced database-objects 46e.

It is specifically intended that the present invention not be limited to the embodiments and illustrations contained herein, but modified forms of those embodiments including portions of the embodiments and combinations of elements of different embodiments as come within the scope of the following claims.

We claim:

1. A method for organizing an object-oriented database comprising the steps of:

(a) providing at least two first customer database-objects having attributes associated with a customer;

(b) defining at least one second customer database-objects as a composite of first customer database-objects (c) providing at least two first product database-objects having attributes associated with a product;

(d) defining at least one second product database-object as a composite of first product database-objects; and (e) defining at least one sales event database-object as a composite of at least one second customer database-object and at least one second product database-object;

wherein at least one of the attributes of the first customer database-objects is selected from the group consisting of data describing customer locations, customer agents, and customer enterprises.

2. The method of claim 1 further including the step of:

(d) capturing a sales event by instantiating a sales event database-object.

3. The method of claim 2 wherein the instantiated sales event database-object uses at least one previously instantiated second customer database-object.

4. The method of claim 2 wherein the instantiated sales event databsse-object uses at least one previously instantiated first customer databaso-object.

5. The method of claim 2 wherein the instantiated sales event database-object uses at least one previously instantiated second product database-object 6. The method of claim 2 wherein the instantiated sales event database-object uses at least one previously instantiated first product database-object.

7. The method of claim 1 further including the steps of providing at least two first fulfillment database-objects having attributes associated a customer fulfillment of product to customers;

defining at least one second fulfillment database-object as a composite of first fulfillment database-objects; and wherein the sales event database-object is defined as a composite of at least one second customer database-object and at least one second product database-object and at least one second fulfillment database-object.

8. The method of claim 7 further including the step of:

(d) capturing a sales event by instantiating a sales event database-object

9. The method of claim 8 wherein the instantiated sales event database-object uses at least one previously instantiated second fulfillment database-object.

10. The method of claim 9 wherein the instantiated sales event database-object uses at least one previously instantiated first fulfillment database-object.

11. The method of claim 1 wherein the attributes of the first customer database-objects are selected from the group consisting of data describing customer locations, customer agents, and customer enterprises.

12. The method of claim 1 wherein the attributes of the first product database-objects are selected from the group consisting of data describing product information, product business, and product designs.

13. The method of claim 1 wherein the attributes of the first fulfillment database-objects are selected from the group consisting of data describing fulfillment logistics, fulfillment services, and a fulfillment manufacturing support chain.

14. A method of accessing strategic sales data associated with products sold to customers and the fulfillment thereof comprising the step of:

(a) modeling a sales transaction as an intersection of a customer object, a product object and a fulfillment object;

(b) defining, in an object-oriented database, a sales event database-object referencing a customer database-object, a product database-object and a fulfillment database-object corresponding to the modeled customer object, the product object and the fulfillment object;

(c) recording each sales transaction as a sales event database-object; and (d) accessing strategic sales data of a sales transaction by accessing a sales event database-object;

wherein the customer database-object directly or indirectly references at least one attribute that is selected from the group consisting of data describing customer locations, customer agents, and customer enterprises.

15. The method of claim 21 wherein the customer object is further modeled as an intersection of three additional customer objects, each of which is also implemented as a database-object corresponding to the additional customer object and referenced by the customer database-object.

16. The method of claim 15 wherein the three additional customer objects are customer location, customer agent, and customer enterprise and wherein the customer database-object is defined as referencing a customer location database-object; a customer agent database-object; and a customer enterprise database-object corresponding to the customer location, customer agent, and customer enterprise.

17. The method of claim 14 wherein the product object is further modeled as an intersection of three additional product objects, each of which is also implemented as a database-object corresponding to the additional product object and referenced by the product database-object.

18. The method of claim 17 wherein the three additional product objects are product information, product business, and product design and wherein the product database-object is defined as referencing a product information database-object a product business database-object, and a product design database-object corresponding to the product information, product business, and product design.

19. The method of claim 14 wherein the fulfillment object is further modeled as an intersection of three additional fulfillment objects, each of which is also implemented as a database-object corresponding to the additional fulfillment object and referenced by the fulfillment database-object.

20. The method of claim 19 wherein the fine additional fulfillment objects are fulfillment logistics; fulfillment services; and fulfillment manufacturing support chain and wherein the fulfillment database-object is defined as referencing a fulfillment logistics database-object, a fulfillment services database-object, and a fulfillment manufacturing support chain database-object corresponding to the fulfillment logistics, fulfillment services, and fulfillment manufacturing support chain.

21. A data structure comprising:

first customer database-objects each having attributes associated with a customer;

at least one second customer database-object defined as a composite of first customer database-objects;

first product database-objects each having attributes associated with a product; and at least one second product database-object defined as a composite of first product database-objects; and a sales event database-object defined as a composite of at least one second customer database-object and at least one second product database-object;

wherein at least one of the attributes of the first customer database-objects is selected from the group consisting of data describing customer locations, customer agents, and customer enterprises.

22. The data structure of claim 21 further including first fulfillment database-objects having attributes associated with a customer fulfillment of product to customers;

at least one second fulfillment database-object defined as a composite of first fulfillment database-objects,; and wherein the sales event database-object is defined as a composite of at least one second customer database-object and at least one second product database-object and at least one second fulfillment database-object.

23. The data structure of claim 21 wherein the attributes of the first customer database-objects an selected from the group consisting of: data describing customer locations, customer agents, and customer enterprises.

24. The data structure of claim 21 wherein the attributes of the first product database-objects are selected from the group consisting of: data describing product information; product business; and product designs.

25. The data structure of claim 21 wherein the attributes of the first fulfillment database-objects are selected from the group consisting of: data describing fulfillment logistics; fulfillment services; and fulfillment manufacturing support chain.

26. A method of capturing sales event data of events over time using an object-oriented database having database-objects that may reference either or both of attributes of the event data and other database-objects, wherein the database-objects are instanceable to create database-object instances referencing either or both of data of the attributes of the database-objects and instances of the other database-objects, the method comprising the steps of:
   (a) defining a set of underlying database-objects, each referencing at least a portion of the attributes of the event data;
   (b) defining an event database-object referencing at least a portion of the underlying database-objects; p1 (c) upon each event having given event data,
      (i) instancing given ones of the set of underlying database-objects referencing new attributes of the given event data; and
      (ii) instancing an event database-object referencing the instanced given ones of the set of underlying database-objects;
   wherein the underlying database-objects include:
      (1) a CUSTOMER database-object in turn referencing other database-objects;
      (2) a PRODUCT intermediate database-object in turn referencing other database-objects; and
      (3) a FULFILLMENT intermediate database-object in turn referencing other database-objects;
      wherein at least one of the attributes referenced, directly or indirectly, by the CUSTOMER database-object is selected from the group consisting of data describing customer locations, customer agents, and customer enterprises.

27. The method of claim 26 wherein the CUSTOMER intermediate database-object in turn references:
   (a) a LOCATION underlying database-object referencing attributes indicating
   (b) an AGENT underlying database-object referencing attributes indicating customer agents; and
   (c) an ENTERPRISE underlying database-object referencing attributes indicating customer enterprises.

28. The method of claim 26 wherein the PRODUCT intermediate database-object in turn references:
   (a) a PRODUCT INFORMATION underlying database-object referencing attributes indicating product information;
   (b) a PRODUCT BUSINESS underlying database-object referencing attributes indicating product business; and
   (c) a PRODUCT DESIGN underlying database-object referencing attributes indicating product designs.

29. The method of claim 26 wherein the FULFILLMENT intermediate database-object in turn references:
   (a) a FULFILLMENT LOGISTICS underlying database-object referencing attributes indicating fulfillment logistics;
   (b) a FULFILLMENT SERVICES underlying database-object referencing attributes indicating fulfillment services; and
   (c) a FULFILLMENT MANUFACTURING SUPPORT CHAIN underlying database-object referencing attributes indicating fulfillment manufacturing support chain.

30. The method of claim 26 wherein the CUSTOMER intermediate database-object in turn references:
   (a) a LOCATION underlying database-object referencing attributes indicating customer locations;
   (b) an AGENT underlying database-object referencing attributes indicating customer agents; and
   (c) an ENTERPRISE underlying database-object referencing attributes indicating customer enterprises; and
   wherein the PRODUCT intermediate database-object in turn references:
      (a) a PRODUCT INFORMATION underlying database-object referencing attributes indicating product information;
      (b) a PRODUCT BUSINESS underlying database-object referencing attributes indicating product business; and
      (c) a PRODUCT DESIGN underlying database-object referencing attributes indicating product designs; and
   wherein the FULFILLMENT intermediate database-object in turn references:
      (a) a FULFILLMENT LOGISTICS underlying database-object referencing attributes Indicating fulfillment logistics;
      (b) a FULFILLMENT SERVICES underlying database-object referencing attributes indicating fulfillment services; and
      (c) a FULFILLMENT MANUFACTURING SUPPORT CHAIN underlying database-object referencing attributes indicating fulfillment manufacturing support chain.

* * * * *